Figure 1:
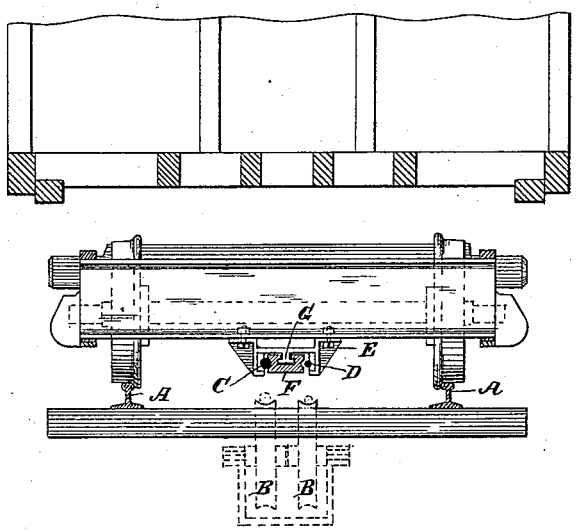

(No Model.)

J. J. ENDRES.

CABLE RAILWAY.

No. 347,784.    Patented Aug. 24, 1886.

2 Sheets—Sheet 1.

Witnesses:

Inventor
John J. Endres.

(No Model.) 2 Sheets—Sheet 2.
J. J. ENDRES.
CABLE RAILWAY.
No. 347,784. Patented Aug. 24, 1886.
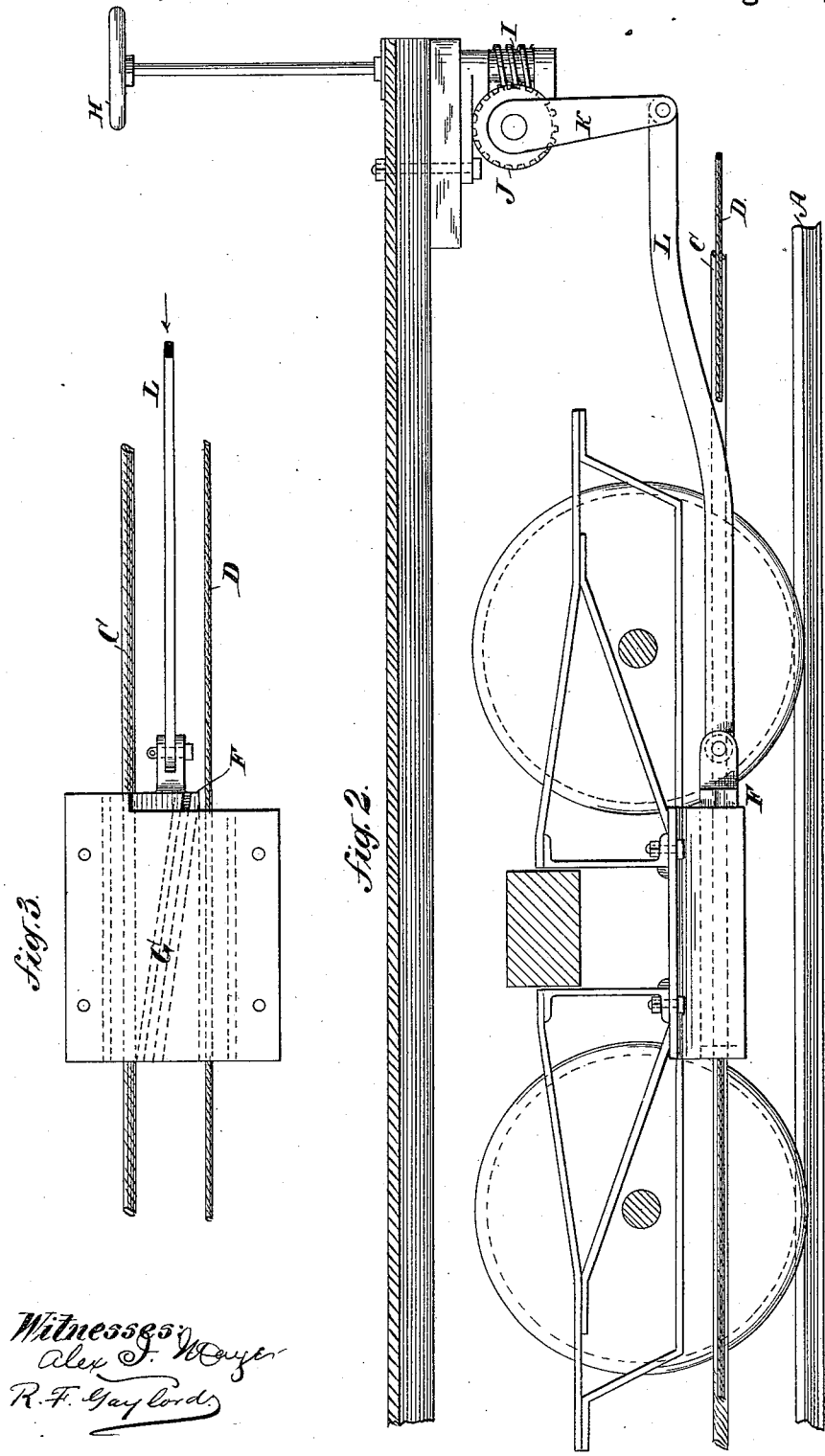
Witnesses:
Alex J. W Dwyer
R. F. Gaylord
Inventor
John J. Endres
by H. Eichling
his Atty.

UNITED STATES PATENT OFFICE.

JOHN J. ENDRES, OF NEW YORK, N. Y.

CABLE RAILWAY.

SPECIFICATION forming part of Letters Patent No. 347,784, dated August 24, 1886.

Application filed February 11, 1886. Serial No. 191,642. (No model.)

*To all whom it may concern:*

Be it known that I, JOHN J. ENDRES, of the city, county, and State of New York, have invented certain new and useful Improvements in Cable Railways, of which the following is a full, clear, and exact description, and will enable those skilled in the art to which they appertain to make and use the same.

The invention relates to cable roads generally, whether surface or elevated roads, and its object is to provide means for practically running cars at a high rate of speed on cable roads.

In order to practically attain a comparatively high rate of speed on a road where the cars are moved by a cable, and particularly where stops must often be made along the road, there are two important conditions that must be satisfied, and the higher the speed at which it is desired to run the cars the more important do these conditions become. First, to start the cars it is necessary to have a slowly-acting, strong, or heavy force; and, second, to impel the cars at a comparatively high rate of speed it is necessary to have a rapidly-acting and hence light force. In roads that have but one cable the first of these requirements is fulfilled by a cable, which is of such size and weight and speed as best adapt it to overcome the dead inertia of its loads, and hence the possibilities of speed are limited by the conditions incident to starting the cars. Furthermore, by reason of the necessary weight of such a cable, it cannot safely be run at a high rate of speed; and, on the other hand, a cable sufficiently small and light to run at a high rate of speed is not adapted to the slow and heavy work of starting the cars. In cable roads where parallel cables running at different rates of speed and of the same or substantially the same size are used, the same difficulties exist to prevent giving the cars a high rate of speed, for here, though one of the cables is restricted as to its speed by the conditions of starting the cars, yet both cables, so far as concerns their mere capacity for running fast, might have the same speed, and the only gain in the possibilities of speed of the cars by using a fast and a slow cable of the same size is the difference between the speed by which the cars can be properly started and the speed that a suitable starting-cable might safely have.

My invention, however, contemplates a speed of the fast cable and the cars very much beyond that practically possible with a cable of the size and weight requisite to properly start the cars from a state of rest—that is, if such a cable be driven at the rate of speed required by the invention, its weight and size would cause it to have a momentum and centrifugal force that would be not only very wearing to the cable itself and to its driving and carrying machinery, but would cause weakening vibrations in the supporting structure, besides making it difficult to apply to the cars the transmitting power of the cable.

My invention consists, therefore, in the use of two parallel cables running in the same direction along the road, one cable being large and slow moving and adapted by its speed and size to start the cars from a position of rest, and the other cable being small and adapted to drive the cars at a much higher rate of speed than that practically possible with the large cable and after the large and slow-moving cable has started them.

The accompanying drawings show in Figure 1 a cross-section of a cable road and car; in Fig. 2 an enlarged detail elevation view of the gripping devices, and in Fig. 3 a plan view of the same.

A A are the track-rails. B B are cable-carrying pulleys, and C is the large and D is the small cable running on the pulleys.

The full black lines show the cables as held up in position for the grips to take hold of them, and the dotted lines show them on their carrying-pulleys.

The cable C is run at a slow rate of speed, and the cable D runs in the same direction at a higher rate of speed—a speed representing the desired maximum speed of the cars. Each car is to be provided with a suitable gripping device or devices that shall be arranged to connect the car with either cable. Any proper gripping mechanism may be used; but, preferably, it should be so constructed as to release one cable when it is made to grip the other. One form of such mechanism is shown, E being a casting that forms the fixed jaw of each grip thereof, and the block or wedge F moving on a guide or way, G, inclined to the fixed gripping-surfaces, being operated from the handwheel H, the worm I of which meshes with the gear J, which carries the crank-arm K, which is directly attached to wedge F by rod L.

When a car is to be started, the large slow-running cable is first connected with the car, and when the car is well under way, or has acquired the speed of the large cable, the car is disconnected from the large cable and attached to the small fast-running cable, which then drives it until it is again stopped. By these means a heavy car can be quickly and easily started from a position of rest and driven along the road at a much higher rate of speed than is practically possible to attain with a single cable, or with two cables of the same size, for that one cable shall be large and one small is a necessary condition, since either cable must be adapted by its size and weight to its speed and to its particular kind of work, and could not in any practical way be made to do the work of the other. So, also, neither cable could be made to practically serve the office of both.

What is claimed as new is—

1. In a cable road, the combination of a large slow-moving cable with a smaller fast-moving cable, in substantially the manner and for the purpose set forth.

2. In a cable road, the combination of a large cable for starting the cars with a small cable for increasing the speed of the cars after being started, as and for the purpose set forth.

3. The combination, in a cable-car system, of a large and slow-moving cable, a parallel small and fast-moving cable, and gripping devices for connecting the car with either cable, which are constructed to grasp but one cable at a time, as and for the purpose set forth.

JOHN J. ENDRES.

Witnesses:
HENRY EICHLING,
A. G. N. VERMILYA.